Feb. 11, 1958     G. D. CAMP     2,823,375
DISTANCE MEASURING SYSTEMS WITH COMPRESSED RETURNED PULSES
Filed Dec. 11, 1951     2 Sheets-Sheet 1

INVENTOR
GLEN D. CAMP

BY
ATTORNEY

Feb. 11, 1958 G. D. CAMP 2,823,375
DISTANCE MEASURING SYSTEMS WITH COMPRESSED RETURNED PULSES
Filed Dec. 11, 1951 2 Sheets-Sheet 2
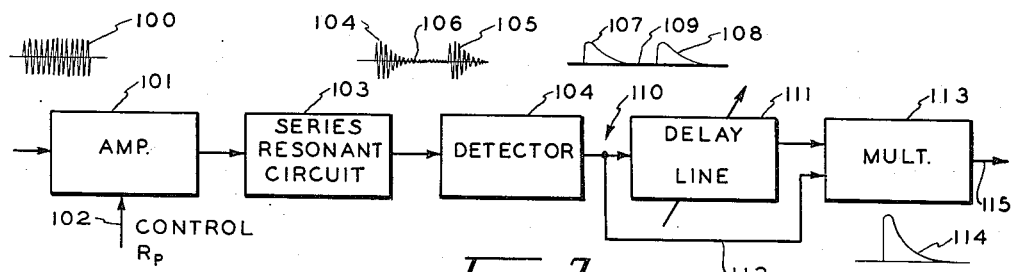
*Fig. 2*
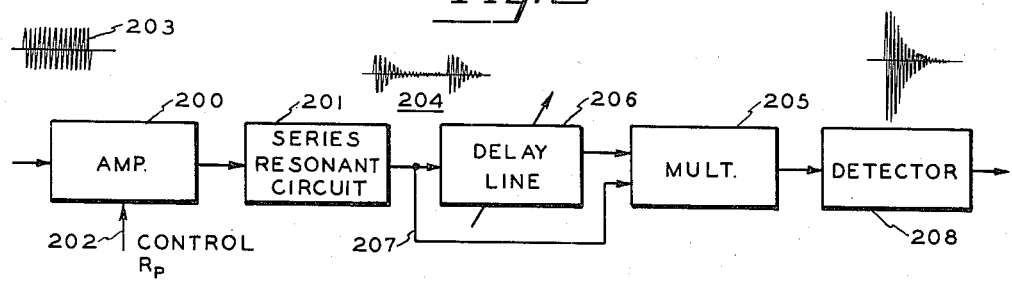
*Fig. 3*
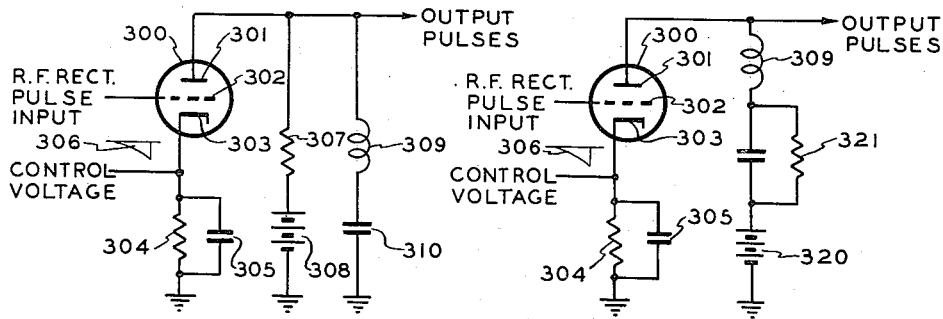
*Fig. 4*
*Fig. 5*
INVENTOR
GLEN D. CAMP
BY
ATTORNEY

United States Patent Office 2,823,375
Patented Feb. 11, 1958

2,823,375

DISTANCE MEASURING SYSTEMS WITH COMPRESSED RETURNED PULSES

Glen D. Camp, Chevy Chase, Md., assignor to Melpar, Inc., Alexandria, Va., a corporation of New York Application December 11, 1951, Serial No. 261,121

11 Claims. (Cl. 343—13)

This application is a continuation-in-part of my application Serial Number 255,403, filed November 8, 1951, and entitled Signal Discrimination in Pulse Radar Systems, now U. S. Patent No. 2,726,386 issued December 6, 1955.

In my prior application I disclosed the theoretical considerations which led to the conclusion that pulse radar systems could be materially improved in respect to ratio of desired to undesired signals, by providing for compression of received radar pulses as a function of range of the target from which the pulses are reflected. In that application I disclosed a radar system in which the transmitted pulses were of non-rectangular form, and in particular were pulses having a relatively slowly attenuating form. It appears, however, that the practical difficulties in the way of producing the required pulses, in the powers required for some radar applications, are considerable, since pulses of the required shapes are not attainable from pulse magnetrons of conventional character.

It is a primary object of the present invention to provide a novel radar system of the pulse type, i. e. in which transmission times of radiant energy pulses, or of other wave energy pulses, to a target and return, is measured to determine range of the target, in which the energy moving toward the target is substantially of rectangular shape, and in which the wave energy returned from the target is subjected to a pulse shortening operation, the extent of pulse shortening being a function of range of the target.

It is a subsidiary object of the invention to provide a system of the above character in which pulse shortening is accomplished by shock exciting a series tuned circuit in response to each pulse, to derive a pair of attenuating pulses therefrom, and in which the attenuating pulses are combined in a mode which is discriminatory against noise.

It is another object of the invention to provide a pulse radar system having optimum desired to undesired signal ratio at all ranges, and in which the transmitted pulses are rectangular.

A further object of the invention resides in the provision of novel pulse shortening techniques.

Another object of the invention resides in the provision of novel noise discriminatory techniques in pulse radar receivers.

Still another object of the invention resides in the provision of a novel radar receiver, capable of providing optimum discrimination as between target and clutter returns, in response to rectangular wave pulse returns.

It is another object of the invention to provide a system of pulse radar, employing rectangular pulse transmissions, in which control of target signal to clutter signal intensity is attainable as a function of range of the target, without requiring control of durations of transmitted pulses.

The above and still further objects, features and advantages of the invention will become apparent upon consideration of the following detailed description of preferred embodiments of the invention, especially when taken in conjunction with the accompanying drawings, wherein:

Figure 2 is a block diagram of a pulse compressor system, utilized in the system of Figure 1;

Figure 3 is a block diagram of a modification of the pulse compressor system of Figure 2;

Figure 4 is a schematic circuit diagram of a shock excited pulse compressor component employed in the systems of Figures 2 and 3; and Figure 5 is a schematic circuit diagram of a modification of the system of Figure 4.

Figure 1:
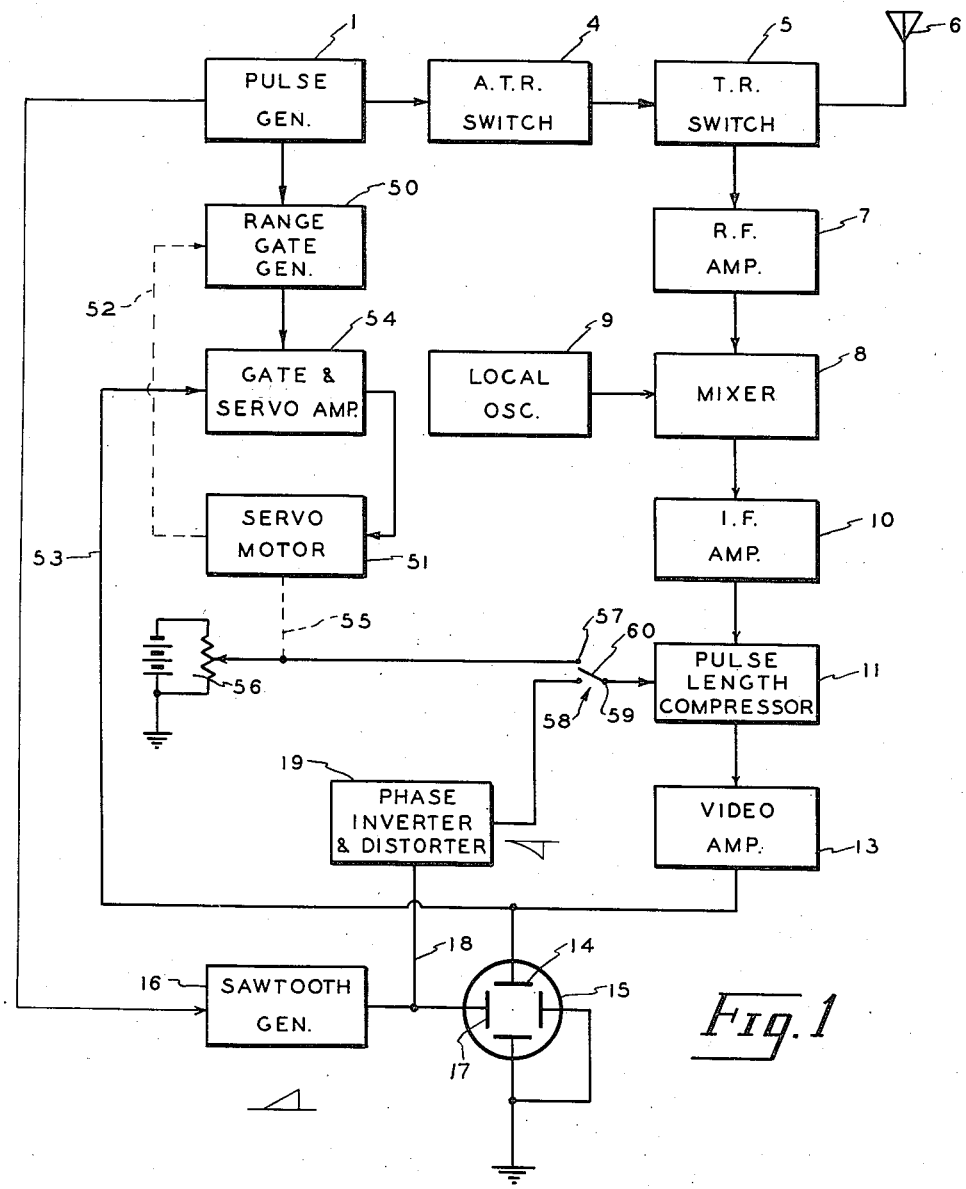
Figure 1 is a block diagram of a pulse radar system, which is conventional except for the addition of devices for compressing received pulses as a function of range.

Briefly described, in accordance with the invention, the present system operates generally in accordance with the philosophy expressed in my prior application, referred to hereinabove, except that rectangular pulses are transmitted instead of attenuating pulses. The pulses must then be compressed as a function of range from which the pulses are returned. To accomplish the latter function each R. F. pulse, whether at carrier or at intermediate frequency, in the radar receiver, is caused to shock excite a series tuned circuit. To this end the received pulses, either before or after frequency conversion, are applied to the input circuit of an amplifier having a series resonant circuit in its output. This circuit is resonant to the pulse frequency, $w_o$, and taken in series with the amplifier tube has a natural frequency $w_n$, which is almost but not quite equal to $w_o$. The series combination of $R_p$, the internal amplifier tube resistance, and the L and C of the tuned circuit, are selected to have a decrement such that when shock excited the shock excitation current will decay to $1/e$ of its peak value in a time much less than the duration of each rectangular pulse, $-e$ being the base of the natural logarithmic system.

When a pulse is first applied to the input circuit of the amplifier tube most of the pulse amplitude appears across the inductance, L, since this element opposes any sudden change in current. This transient voltage then decays at a rate determined by the losses of the series circuit including $R_p$, L and C, plus any losses existing in the physical devices providing L and C. The steady state voltage existing across the L, C combination is quite small, and is dependent on R, the resistance of the coil or other inductive element which provides L, assuming a perfect or loss free condenser. To a first approximation R may be assumed to equal zero.

An equivalent series of events occurs in response to the termination of each rectangular pulse.

Roughly speaking, then, the voltage amplitude across L, C, and R (providing an impedance Z) first rises rapidly to a high peak value, then in a time of the order $$T' = \frac{2L}{R+R_p}$$

falls to a fraction $$\frac{R}{R+R_p}$$

of its input value. This low value continues until the input pulse terminates, and then a new and similar transient (phase excepted) again occurs.

Considering the first transient, as exemplary, the input pulse is taken as zero until time zero, and as $E \sin W_o t$ thereafter, for the duration of the pulse. The voltage drop across Z is $$\frac{ER_p}{R+R_p}\left(\frac{w_o}{w_n}e^{-at}\sin w_n t\right)+\frac{ER}{R+R_p}\sin w_o t$$

Here $\alpha$ is the decay constant of the total impedance $R+R_p$. By making $R_p$ large relative to $R$ the transient term (first term) can be made to dominate the steady state term (second term) of the equation, sufficiently that for all practical purposes only the first term exists. We therefore have a damped pulsed with decay constant given by $$\frac{R+R_p}{2L}$$

and the time $T'$ can be varied at will by varying $R_p$.

The same analysis applies at the end of the pulse, and generally the analysis applies whether or not the input rectangular pulses are truly rectangular or not. To the extent that the corners of the rectangular pulses are rounded off, or to the extent that the rectangular pulses have finite rise times, the transient pulses generated will have lower peak values, but the above analysis will still hold.

To convert the double pulses, occurring at the beginnings and ends of the rectangular pulses, into single pulses the pulses are delayed by a time equal to pulse duration $T$ of the rectangular pulses, and multiplication of delayed and undelayed pulses accomplished. This yields a new signal, equal to zero unless two multiplication factors are simultaneously available at the input of the multiplier. If desired, the pulses may be detected prior to multiplication. In either case each received rectangular pulse is compressed, and forms a single compressed pulse as a consequence of the above decribed operations.

I have explained in my prior application, above referred to, on what basis the lengths of the compressed pulses may be selected, to accomplish improved radar operation, and therefore dispense with any duplication of this explanation in the present application.

Referring now more particularly to the drawings, the reference numeral 1 identifies a pulse oscillator, which generates short pulses of high amplitude. A suitable value might be 10 microseconds in a 10 cm. radar, for example. The output of oscillator 1 is passed through an ATR switch and a TR switch 5, in accordance with practices well understood in radar art, and transmitted via antenna 6 to a remote object for reflection therefrom as an echo signal.

The echo signal is returned from a remote target (not illustrated) and received by antenna 6, proceeding via TR switch 5 to radio frequency amplifier 7, for amplification, and thence to mixer 8, for frequency conversion by mixing with the output of local oscillator 9. The desired output component of the mixer 8 is selected in I. F. amplifier 10 and applied to a pulse length compressor 11, the specific character of which will be disclosed hereinafter, but which includes a detector, or other means for providing detected output pulses. The detected pulses are amplified to a suitable value in video amplifier 13, and the output of the latter are applied to the vertical deflection electrode 14 of a cathode ray tube indicator 15.

The output of pulse generator 1 is applied to synchronize the output of a sawtooth generator 16, the sawtooth commencing in response to each pulse and enduring for a time between pulses proportioned to the maximum detection range expected of the equipment, in accordance with the current and usual practice. The sawtooth voltage deriving from sawtooth generator 16 is applied to produce recurrent horizontal scans across the face of cathode ray tube 15, by connecting the output voltage to the horizontal deflection electrode 17 of cathode ray tube 14.

The output of sawtooth generator 16 is also applied via lead 18 and polarity reverser 19 to the pulse compressor 11, where pulse compression takes place in accordance with the instantaneous amplitude of the sawtooth voltage provided by the generator, i. e. as a function of range. The polarity reverser 19 may serve to provide distortion of the sawtooth output of the sawtooth generator 16, if this is necessary to obtain the desired overall system performance, i. e. $S/C=S/N$ at all ranges.

The radar system described hereinabove and illustrated in Figure 1 of the accompanying drawings may be designed for microwave operation, in which case the R. F. amplifier 7 may be designed for optimum response, i. e. optimum signal to noise ratio, it being well known that this involves a band pass in megacycles substantially equal to the reciprocal of the pulse length in microseconds, when rectangular pulses are employed. This relation between optimum R. F. band pass and pulse decay rate exists in the present system, and it is therefore feasible to design the system for optimum signal to noise ratio $$\frac{(S)}{(N)}$$

at a maximum range $R_m$. It is realized that signal to noise will then increase with decrease of range, at a very rapid rate, i. e. as $1/R^4$, where $R$ is range.

A rough plot of the dependence of $S/N$ on $R$ is provided in Figure 4 of the drawings accompanying my prior application, hereinabove referred to. The dependence of the ratio $S/C$, signal to clutter, is also graphically indicated in Figure 4 of that application for three values of pulse length, and it is there indicated that for short pulse lengths signal-to-clutter $S/C$ is high, while for great pulse lengths $S/C$ is small, and a rough idea of the dependence of $S/C$ on range is provided. It will be recalled in this connection that $S/C$ for any given pulse duration is a function of range because at increased ranges radar beam divergence results in finding of more clutter targets. It has further been pointed out that increased pulse length also result in decreased $S/C$ because a longer pulse returns more clutter echo simultaneously with desired target echo, since it finds clutter targets over a greater spread of ranges.

In accordance with a preferred embodiment of the present invention, I select a transmitter pulse duration, and a corresponding R. F. band width in the receiver of the system, which makes $S/C$ and $S/N$ equal at $R_{max}$, and which provides simultaneously the desired radar operating characteristics, such as minimum range, target discrimination, pulse energy, peak pulse power, maximum range, beam width, and the like.

I then compress pulse length as a function of range, in the radar receiver, so as to keep $S/N=S/C$ for all ranges, as nearly as possible, thereby obtaining the optimal combination of values for both $S/N$ and $S/C$ in a given radar equipment, operating under any given set of conditions. It will be noted that were it not for this operation the system would be clutter limited at all ranges except $R_{max}$ per the dotted graph.

It will also be realized, while I have disclosed the pulse compressor 11 as compressing pulses at intermediate frequencies, that the operation may be more effective at radio frequencies, i. e. at a position in the receiver preceding the mixer.

Should it be desired to utilize the present invention in a range tracking radar system the servo of the system may be employed to set a desired control voltage into the range compressor, to maintain $S/C=S/N$ for the particular range being tracked.

In this connection, a range gate generator 50 may be driven in response to pulses provided by pulse generator 1, the range established being that determined by the position of a servo-motor 51, via linkage 52, by control of the timing of the gate pulse output of the range gate generator 50. The output of the video amplifier 13 is applied, via lead 53 to the input of a gate and servo-amplifier 54, to which is also applied the output of the range gate generator 50, for purposes of comparison. The output of the gate and servo-amplifier 54 is then a function of the relative time positions of the outputs of video amplifier 13 and range gate generator 50, and is applied to control the position of the servo motor 51 in such sense as to make these time positions the same. The position of the servo motor 51 is then representative of range, during range tracking, and may be utilized to control, via linkage 55, the voltage output of a potentiometer 56. The latter is applied to a terminal 57 of a two position switch 58, having a further terminal 59 connected to the output of phase inverter and distorter 19, and the positionable arm 60 of which is connected to pulse compressor 17.

Accordingly, the position of the arm 60 determines whether the control voltage applied to pulse compressor 11, to determine the degree of pulse compression accomplished therein, shall be a relatively steady D.-C. voltage representative of a range being tracked, and variable in correspondence with that range, or whether that voltage shall be a modified sawtooth capable of applying variable compression for all ranges, as a repetitive function of time.

It will be clear that with arm 60 of switch 58 in contact with terminal 57, if the servo 51 is disabled, or disconnected from potentiometer 56, that the voltage output of the latter may be controlled manually, and set to any one desired range in this way.

In a practical system, it will be clear that the potentiometer 56 will be properly tapered to provide the required law of variation of control voltage output therefrom as a function of range.

It will also be clear that suitable provision is desirable for varying the distortion introduced into sawtooth S by phase inverter and distorter 19, as required by the type of clutter encountered, or by other operational conditions. No specific provision of this kind is illustrated or described, since it can be introduced into the system in various ways, by exercise of the expected skill of the engineer.

Reference is now made to Figure 2 of the accompanying drawings, wherein is illustrated one embodiment of a pulse compressor arranged in accordance with the present invention. Input pulses, of substantially rectangular shape, as 100, are derived from the intermediate frequency amplifier of the radar receiver illustrated in Figure 1 of the accompanying drawings, and applied to an amplifier 101, having appropriate circuits for controlling the internal resistance of the amplifier in response to a control voltage applied via lead 102. The amplifier 101 has in its plate circuit a series resonant circuit 103, which sets up an attenuating train of pulses in response to both the initiation and determination of the pulse 100, these being illustrated at 104 and 105, and which sets up a low amplitude signal at the frequency of the pulse 100 in the time interval intermediate initiating and terminating attenuating trains. Voltage derived from across the series resonant circuit 103 is detected in a detector 104, producing in response to each initiating and terminating train 104, 105, a high D.-C. peak as 107, 108, and producing in the intermediate time a very low level D.-C. or detected component 109. The entire signal ensemble, consisting of the short pulse peaks 107, 108, and the intermediate low level signal 109, may be identified by the reference numeral 110. The pulse ensemble 110 is applied to the input of an adjustable delay line 111, having a normal delay equal to the duration of the original pulse 100. The pulse ensemble 110 is also applied without delay to a lead 112. The output of the delay line 111 and the signal available on the lead 112 are applied jointly to a multiplier 113, from which may be derived a single pulse 114 on an output lead 115.

It will be clear from the nature of multipliers, as 113, that no output can be derived except while two input signals are impressed therein. Accordingly the leading pulse peak 107 passes directly to the multiplier 113 via the lead 112, but produces no output therefrom. This leading pulse peak 107 also passes to the multiplier via the delay line 111, and when it arrives at the multiplier 113 so also does the pulse peak 108 via the lead 112. Accordingly there is then available at the multiplier 113 a pair of pulses at its inputs, which can give rise to an output pulse. When the trailing pulse peak 108 arrives at the multiplier 113 via the lead 112, there is no further signal available to the multiplier 113, and accordingly the output of the multiplier 113 again drops to zero. Accordingly the delay line 111 and the associated multiplier 113 represents a device for combining the pulse peaks 107 and 108.

The use of the multiplier 113, fed by relatively delayed pulses, in addition to enabling the combination of two spaced pulses into a single desired pulse, has the further effect common to auto-correlators, that noise is discriminated against. Explaining this effect in a simple manner, noise is a random phenomenon, or consists of very short spikes occurring at random times. The net effect of multiplying two time extended noise signals, one of which has been delayed with respect to the other, thereafter integrating the result of the multiplication, is to produce a signal equal to zero, on a statistical basis. Integration, in the case of the system of Figure 2, occurs in the video amplifier of the radar receiver of Figure 1 of the accompanying drawings. It follows that the utilization of the pulse compressor of Figure 2 in the radar system of Figure 1 of the accompanying drawings, results not only in pulse compression, with consequent increase of desired signal to clutter signal ratio, but also in discrimination against noise accompanying the pulses or occurring intermediate the pulses, and which finds its source anywhere in the system prior to the output of the multiplier 113.

In Figure 3 of the accompanying drawings is illustrated a modification of the pulse compressor of Figure 2. The difference between the systems of Figures 2 and 3 is primarily that in the system of Figure 3 the quantities multiplied are at carrier frequencies, whereas in the system of Figure 2 the multiplied quantities were detected or D.-C. pulse ensembles.

Referring now more particularly to the system of Figure 3 of the accompanying drawings, the reference numeral 200 represents an input amplifier, having in its output circuit a series resonant device, which may, for example, be comprised of an inductance and capacity in series, and the amplifier 200 is provided with a device for controlling its internal resistance, $R_p$, in response to a voltage applied to a lead 202. The pulse input to the amplifier 200 is derived from the intermediate frequency amplifier of the radar receiver illustrated in Figure 1 of the accompanying drawings. The output of the resonant circuit, 201, is similar to the output of the corresponding resonant circuit in the embodiment of my invention illustrated in Figure 2 of the accompanying drawings, and consists of a pulse component at carrier frequency, which rises very rapidly in response to the initiation of the input pulse 203 of the amplifier 200, a corresponding pulse of high peak amplitude and attenuating characteristic in response to the termination of the input pulse 203, and a low level sinusoidal wave at carrier frequency in response to the intermediate portion of the pulse 203.

The two spaced pulses of high peak value and attenuating characteristic, separated by a low level signal may be identified by the reference numeral 204, and denominated a pulse ensemble.

The pulse ensemble 204 is applied to a multiplier 205 via an adjustable delay line 206 and directly via a lead 207. The resultant output of the multiplier 205 is then detected in a detector 208, and applied to the video amplifier of the radar receiver. Accordingly the system of Figure 3, as the system of Figure 2, represents a pulse compressor.

Due to the use of a multiplying device 205 together with an integrator, represented in the case of Figure 3 by the detector 208, the advantages of auto-correlation technique are present in the compressor of Figure 3, so that the system not only provides improved signal-to-clutter ratio, but also improved signal-to-noise ratio for the overall system.

In the systems of Figures 2 and 3, the elements of the systems are conventional except for the shock excited amplifier-resonant circuit combination. Accordingly, two embodiments of shock excited devices suitable for use in the compressors of Figures 2 and 3 are represented in Figures 4 and 5 of the accompanying drawings.

Referring now more specifically to Figure 4 of the accompanying drawings, the reference numeral 300 represents a vacuum tube amplifier having a plate 301, a control electrode 302, and a cathode 303. It will be realized that while I have illustrated a vacuum tube 300 having a single grid, that multi-grid tubes may be employed, or that in the alternative transistors may be employed if desired. Connected in the cathode lead of the triode 301 is a resistor 4, by-passed by a capacity 305 having an extremely low impedance to the carrier frequency of the signals applied to the input of the amplifier. Accordingly, the cathode 303 is at ground potential for radio frequencies, but by applying a relatively slowly varying D.-C. to the cathode, there may be developed a voltage across the resistance 304, suitable for varying the internal resistance, $R_p$, of the tube 301. The internal resistance of the tube 301 is varied in response to a sawtooth voltage 306, and corresponds with the output of the phase inverter and distorter 19 of Figure 1 of the accompanying drawings. It follows that the internal resistance, $R_p$, of the tube 300 is decreased as a function of increasing range from which return pulses may be expected, during the operation of the system of Figure 1 as a radar or distance measuring device.

Connected in the anode circuit of the tube 300, is a very high load resistance 307 in series with a B+ supply 308. It is essential that the load resistance 307 be very much higher in value than is the internal resistance, $R_p$, of tube 300, for reasons that will appear as the description proceeds. Further connected between ground and the anode 301 of the tube 300 is a series resonant circuit consisting of an inductance 309 and a condenser 310. It may be assumed that the inductance 309 has some resistance, which may be represented by the letter R, but which is not illustrated in the drawings. The condenser 310 may, for all practical purposes, be assumed loss-free.

When a square wave carrier frequency pulse is applied to the control electrode 302 of the tube 300, the inductance 309 presents very high impedance to the initiation of the pulse, as it does also to the termination of the pulse. On the other hand, the condenser 310 is essentially a short circuit for very sharply rising signals or very sharply falling signals, and accordingly the voltage developed in the output circuit of the tube 300 is essentially that developed across the inductance 309, and has a very high value. This voltage then attenuates as an oscillation, having a frequency corresponding with the natural frequency, $w_n$, of the circuit including 309, 310 and the internal resistance, $R_p$, of the tube 300. The resistance of the plate load 307 was purposely selected to be very high, relative to $R_p$, whereby the effective total resistance in series with the series resonant circuit 309, 310 is the internal resistance of the tube 300, and very little energy dissipates through the plate load resistance 307.

After the initial pulse has died out, as a logarithmically attenuating function, the series circuit 309, 310 is driven at the frequency of the R. F. pulse, $w_o$, which is slightly different than the natural frequency of the entire circuit, $w_n$. However, the total steady state series impedance of inductance 309 and condenser 310 to the carrier frequency is extremely low, since the series circuit is resonant. Accordingly, most of the voltage available is taken up in the internal resistance, $R_p$, of the tube 300, and very little voltage appears across the output circuit. The voltage that does appear is the product of the current flowing, by the internal resistance of the inductance 309, hereinbefore represented as R.

Various forms of the circuit of Figure 4 have been devised, and I accordingly do not desire to be limited to any specific type of circuit. For example, the series circuit 309, 310 may take the form of a transmission line, it being well known that a quarter wave transmission line, open circuited at its output end, is equivalent to a series circuit as seen from its input end. Other equivalents, in the form of wave guide circuits and resonant cavities, are known to exist and may be substituted for the lumped circuit illustrated in Figure 4, without departing from the spirit of the invention.

Referring to Figure 5 of the accompanying drawings, there is shown a further modification of the system of Figure 4, employing lumped circuitry for purpose of illustration. In the system of Figure 5 the tube and its means for controlling the internal resistance, $R_p$, of the tube are identical with the corresponding elements of Figure 4. The sole distinction arises in the anode circuit of the tube. In the system of Figure 5 there is provided an inductance 309 and a condenser 310, which are in series, and which are series resonant to the applied carrier pulses, but these are taken in series with a B+ source 320. Across the condenser 310 is connected a very high resistance 321. The later then provides a D. C. path for voltage applied to the anode 301 of the tube 300. However, when the circuit 309, 310 is oscillating, or is driven in response to the carrier pulse voltage, the condenser 310 represents an extremely low shunting impedance to the resistance 321, so that for carrier frequencies it may be assumed that the resistance 301 is absent from the circuit. The output voltages available from across the tuned circuit are then precisely the same as those present in the circuit of Figure 4, making allowance for the difference in location of the resistance 307 and the resistance 321 in the two cases, and for any differences in magnitudes of these resistances which may exist.

While I have described and illustrated various specific forms of the present invention, these represent preferred forms only, and I do not desire to be limited in respect to the breadth of my invention except as required by the scope of the appended claims.

What I claim and desire to secure by Letters Patent of the United States is:

1. In a distance measuring equipment, a source of substantially rectangular pulses of predetermined durations, means for transmitting said pulses to a remote target for return therefrom, a receiver for the returned pulses, said receiver comprising means responsive to each of said pulses for generating a pulse of further duration less than said predetermined duration, and means for controlling said further durations as a function of distance of said target.

2. A system for improving the signal to clutter ratio of a pulse type distance measuring equipment, comprising, means for transmitting substantially rectangular pulse signals recurrently to a target for reflection from said target as echo pulses, means for receiving said echo pulses, said means for receiving providing a predetermined law of variation of signal to noise with range of said target, and means for varying the signal to clutter ratio of said system as a function of range of said target to establish at least approximate correspondence of said signal to clutter ratio and said signal to noise ratio for a relatively large number of values of range wherein said last mentioned means comprises means for compressing the received pulses as a function of distance of said target.

3. In a pulse radar system, means for transmitting substantially rectangular pulses of constant frequency to a desired target for return therefrom, means for receiving the target return pulses admixed with clutter pulses, means for increasing the ratio of energies of target return pulses to clutter pulses in a predetermined time interval shorter than the duration of one of said return pulses, comprising means for compressing in respect to duration all said target return and clutter pulses.

4. The combination in accordance with claim 3 wherein said means for compressing said target return and clutter pulses comprises an impedance Z comprising a series resonant circuit having a resonant frequency equal to the frequency of said pulses and relatively low effective resistance, means for energizing said series resonant circuit comprising a driving device having relatively high resistance and responsive to said target return and clutter pulses, and means for deriving compressed pulses from across said series resonant circuit.

5. In a distance measuring equipment, a source of pulsed carrier waves having substantially rectangular shapes and predetermined durations, means for transmitting said pulsed carrier waves to a remote target for return therefrom, a receiver for the return pulses, said receiver comprising means responsive to each of said pulsed carrier waves for generating a pulsed carrier wave of duration less than said predetermined duration, and means for controlling the durations of each of said pulsed carrier waves of duration less than said predetermined duration as a function of distance of said target.

6. The combination in accordance with claim 5 wherein said means for decreasing the duration of said pulsed carrier waves comprises a tuned circuit, means for exciting said tuned circuit in response to said pulsed carrier waves, said tuned circuit substantially tuned to the frequency of said pulsed carrier wave, means for deriving signal outputs from across said tuned circuit, means for delaying said signal outputs by a time equal to the duration of one of said pulses to provide a delayed signal output, and means for multiplying said signal output by said delayed signal output to derive a resultant compressed pulse.

7. A system for improving the signal to clutter ratio of a pulse type distance measuring equipment, comprising means for transmitting a substantially rectangular radio frequency pulse signal to a target for reflection from said target as an echo pulse, means for receiving said echo pulse, said means for receiving providing a predetermined law of variation of signal to noise ratio with range of said target, means for varying the signal to clutter ratio of said system as a function of range of said target to establish at least approximate correspondence of said signal to clutter ratio and said signal to noise ratio for a relatively large number of values of range, said last means comprising means for compressing said radio frequency pulses as a function of range.

8. In a radar system, means for generating radio frequency pulses of substantially rectangular shape, means for transmitting said radio frequency pulses to a remote target for return therefrom, a receiver for receiving the returned radio frequency pulses, said receiver comprising a pulse compressor for said radio frequency pulses, said pulse compressor comprising a tuned circuit, means for shock exciting said tuned circuit in response to the initiation and termination of each of said pulses, means for deriving signal output from said tuned circuit, means for delaying said signal output by a time equal to the duration of each of said pulses to provide a delayed signal output, and means for multiplying said signal output by said delayed output, to derive a resultant compressed pulse.

9. In a radar system, means for transmitting pulses to a remote target for return therefrom, means for receiving the returned pulses, said pulses being of predetermined length and of substantially rectangular shape, means for deriving a pair of compressed pulses from each of said echo pulses, means for relatively delaying one of said pair of pulses into time coincidences with the other, means for multiplying the delayed pulse by the other, and means for integrating the product resultant.

10. A radar system for operation in detecting targets located to and including a maximum range, said system including a substantially rectangular pulse transmitter and means for receiving said pulses, after return from a target, said pulses having each a duration such that the ratio of signal from a desired target to signal from clutter ($S/C$) is substantially equal to the ratio of signal from a desired target to noise ($S/N$) at said receiver, at said maximum range wherein said means for receiving includes means for compressing the returned pulses, as a function of range, so as to retain substantially equality of $S/N$ to $S/C$ for a plurality of ranges including said maximum range.

11. A system for improving the signal to clutter ratio of a pulse type distance measuring equipment, comprising, means for transmitting substantially rectangular pulse signals recurrently to a target for reflection from said target as echo pulses, means for receiving said echo pulses, said means for receiving providing a predetermined law of variation of signal to noise with range of said target, and means for varying the signal to clutter ratio of said system as a function of range of said target to establish at least approximate correspondence of said signal to clutter ratio and said signal to noise ratio for a relatively large number of values of range, said means for varying said signal to clutter ratio comprising means for compressing the received pulses inversely as a function of time.

References Cited in the file of this patent

UNITED STATES PATENTS

| | | |
|---|---|---|
| 2,474,875 | White | July 5, 1949 |
| 2,536,346 | Bradley | Jan. 2, 1951 |
| 2,568,441 | Fyler | Sept. 18, 1951 |
| 2,577,355 | Oliver | Dec. 4, 1951 |
| 2,578,253 | Lawrence | Dec. 11, 1951 |
| 2,590,836 | Andrew | Apr. 1, 1952 |
| 2,592,611 | Simon et al. | Apr. 15, 1952 |
| 2,592,855 | Bowen | Apr. 15, 1952 |
| 2,617,982 | Holschuh | Nov. 11, 1952 |
| 2,624,876 | Dicke | Jan. 6, 1953 |